Nov. 11, 1941.    P. KOLLSMAN    2,262,008
INDICATING INSTRUMENT
Original Filed March 30, 1939    5 Sheets-Sheet 1

Inventor
Paul Kollsman
by Gunter Rathke
his Attorney

Nov. 11, 1941.　　　　P. KOLLSMAN　　　　2,262,008
INDICATING INSTRUMENT
Original Filed March 30, 1939　　5 Sheets-Sheet 2

Inventor
Paul Kollsman
By Gunter Rathke
his Attorney

Nov. 11, 1941.   P. KOLLSMAN   2,262,008
INDICATING INSTRUMENT
Original Filed March 30, 1939   5 Sheets-Sheet 3

Inventor
Paul Kollsman
by Gunter Rathke
his Attorney

Nov. 11, 1941.   P. KOLLSMAN   2,262,008
INDICATING INSTRUMENT
Original Filed March 30, 1939   5 Sheets-Sheet 5
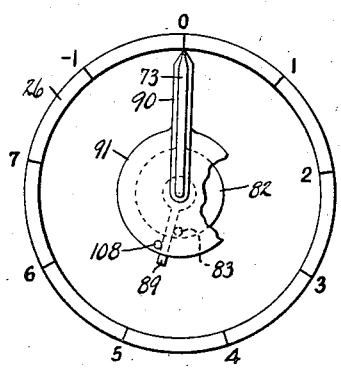
Fig. 8.
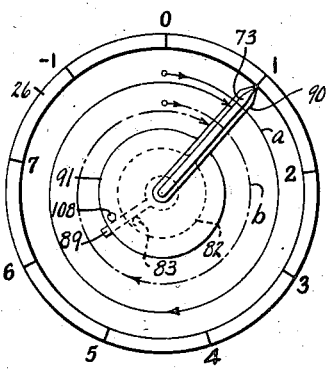
Fig. 9.
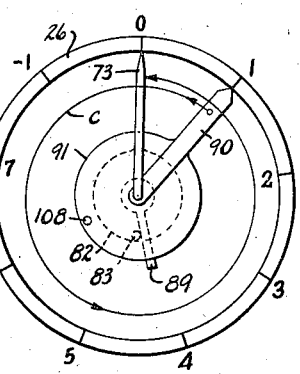
Fig. 10.
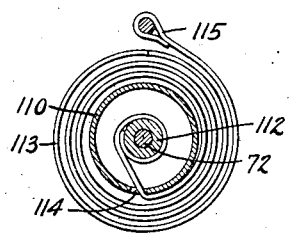
Fig. 8.ª
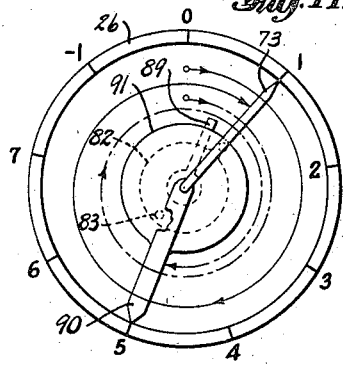
Fig. 11.
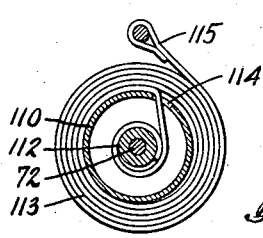
Fig. 11.ª
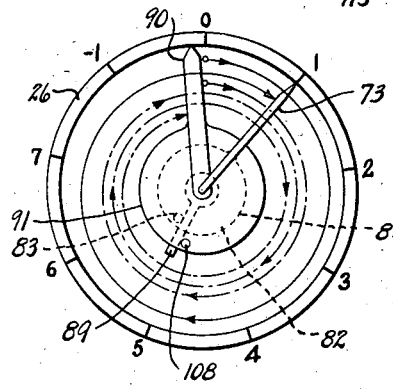
Fig. 13.
Fig. 12.
Inventor
Paul Kollsman
by Gunter Rath
his Attorney Patented Nov. 11, 1941

2,262,008

UNITED STATES PATENT OFFICE 2,262,008

INDICATING INSTRUMENT

Paul Kollsman, Greenwich, Conn., assignor; by mesne assignments, to Square D. Company, Detroit, Mich., a corporation of Michigan Original application March 30, 1939, Serial No. 264,926. Divided and this application October 17, 1940, Serial No. 361,574

6 Claims. (Cl. 116—129)

This invention relates to indicating instruments, more particularly to instruments having indicating means for indicating maximum as well as instant values.

This application is a division of my co-pending application Serial No. 264,926, filed March 30, 1939.

It is an object of this invention to provide an indicating instrument having an instant and a maximum pointer in which the position of the maximum pointer will not be disturbed by the instant pointer even if the maximum pointer is advanced 360° or more beyond the position of the instant pointer.

More particularly, it is an object of this invention to provide an indicating instrument with a maximum pointer in which the maximum pointer is capable of making two complete revolutions with respect to the instant pointer.

It is a further object of the invention to provide an indicating instrument having a maximum pointer so constructed that even under strong vibrations the position of the maximum pointer will not be disturbed.

Further aims, objects and advantages of this invention will appear from a consideration of the accompanying drawings showing for purely illustrative purposes an accelerometer as an embodiment of this invention. It is to be understood that the description is not to be taken in a limiting sense, the scope of this invention being defined in the appended claims.

Referring to the drawings:

Fig. 8 is a diagrammatic view illustrating certain parts of the instrument in normal or zero position when the instrument is at rest;

Fig. 8a is a fragmentary view of the position of a hair spring about one of the pointer shafts when the instrument is in normal or zero position corresponding to Fig. 8;

Fig. 9 is a diagrammatic view showing the pointers or hands at the instant of maximum normal reading of the instrument when both hands have moved around to the maximum range of the instrument in normal use;

Fig. 10 is a diagrammatic view showing the instrument brought to rest after an accelerated movement leaving the maximum reading pointer in position;

Fig. 11 is a diagrammatic view showing the pointers in the position they assume under abnormal shock conditions;

Fig. 11a is a fragmentary view of the hair spring shown in Fig. 8a but corresponding to the position of the pointers shown in Fig. 11;

Fig. 12 is a diagrammatic view showing the momentary reading pointer returned to zero position leaving the maximum reading pointer in the position shown in Fig. 11; and Fig. 13 is a diagrammatic view for further facilitating description.

Figure 1:
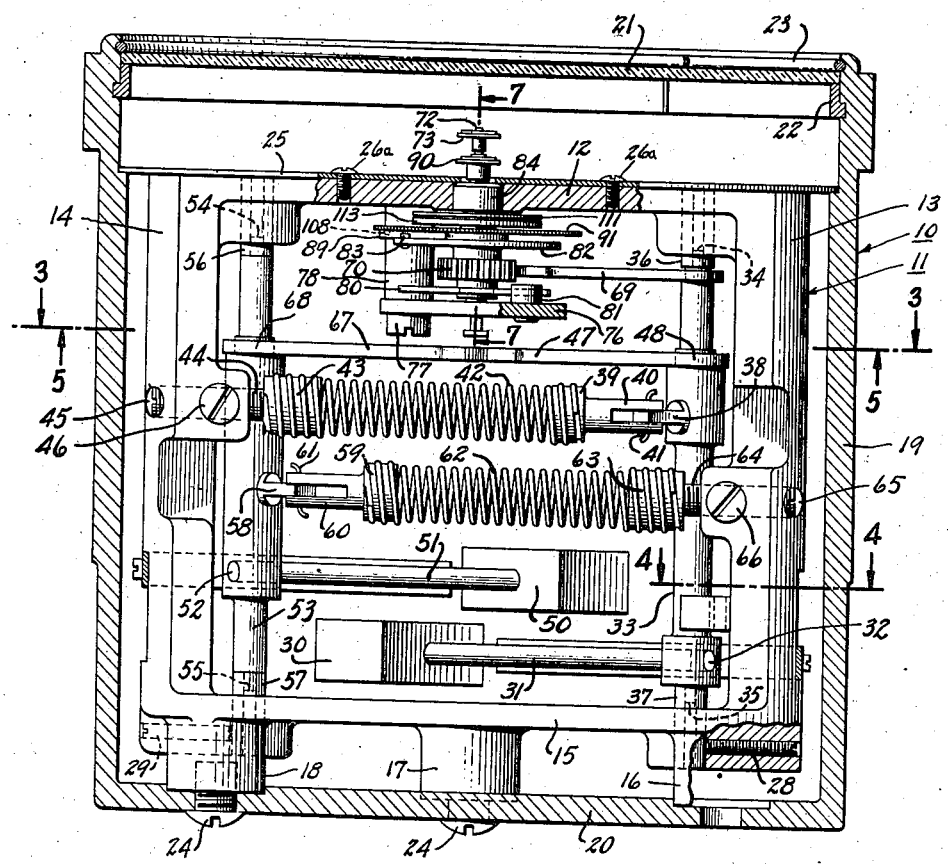
Fig. 1 is a side elevation with the casing shown in section.
Figure 2:
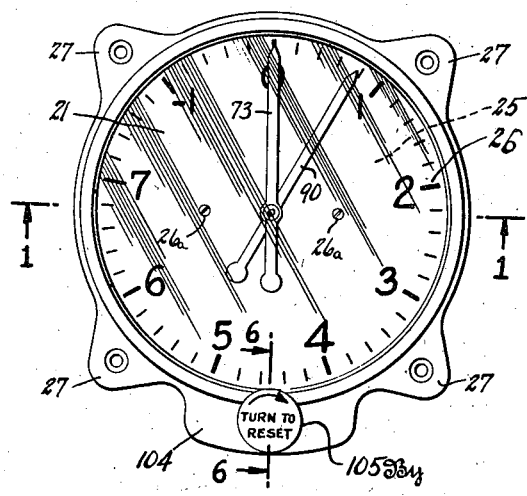
Fig. 2 is a plan view of the face of the instrument after it has made a recording.

In the following description and in the claims, parts will be identified by specific names for convenience, but they are intended to be as generic in their application to similar parts as the art will permit.

In the drawings accompanying and forming part of this specification, a practical commercial embodiment of the invention is shown, but as such illustration is primarily for purposes of disclosure, it will be understood that the structure may be modified in various respects without departing from the spirit and scope of the invention as hereinafter defined and claimed.

Referring now to the drawings, in which like reference characters denote like parts in the several figures, the instrument, shown for purposes of illustration, comprises a housing 10 in which is mounted a frame 11 affording support for the operating parts.

The frame, which may be of cast metal, comprises a face wall 12, a pair of standards 13 and 14 and a rear wall 15 which may be in the shape of an open ring. Extending from the rear wall are a plurality of lugs 16, 17, and 18. The housing or casing 10 of generally cup shape form, which may be of metal, a phenol condensation product, or other suitable material, comprises a cylindrical side wall portion 19, a rear wall 20 and an open end which may be enclosed with a transparent disc 21 which may be of glass or other desirable transparent material. The glass disc 21 may abut a ring 22 and be removably held in place by a split clamping ring 23. Shoulders 27 extending from the housing provide means for conveniently securing the instrument to the movable body, the acceleration of which is to be measured.

The frame 11 may be rigidly held in the housing by means of screws 24 extending through the rear wall 20 into the lugs 16, 17 and 18 of the frame. Secured by means of screws 26a to the face end 12 of the frame 11 is a dial 25. The dial is provided with a graduated scale 26 which may be in g units or other suitable graduations.

Mounted in the frame 11 are a pair of substantially symmetrical lever systems. A weighted lever comprising a weight 30 and an arm 31 is fixedly mounted at its opposite end 32 to an arbor 33. Arbor 33 may be pivotally mounted and, as shown, journals 34 and 35 at the opposite ends of the arbor may be journaled in suitable bearings 36 and 37 mounted in the face and rear walls respectively of the frame 11. A set screw 28 may be provided for adjustment of the bearing 37.

Fixedly mounted on the arbor 33 is an outwardly extending arm 38 adapted to provide a pivot connection with a spring holder 39. The arm 38 is adapted to fit in the bifurcated end 40 of the spring holder and a pivot pin 41 extends through openings in the bifurcated end 40 and the arm 38 to provide the pivot connection just mentioned.

A helical retention spring 42 is fixed at one end to the spring holder 39 and at the other to an adjustably secured spring holder 43. The spring holder 43 may be provided with a threaded portion 44 extending into a female threaded opening 45 in the frame 11. Consequently, the pull or restraining force of the spring 42 may be varied and adjusted. A set screw 46 may be provided for maintaining the spring holder 43 in adjusted position.

Also fixedly mounted to arbor 33 is a gear segment 47 secured at its axis 48 to the arbor 33. This gear segment intermeshes with a corresponding gear segment fixed to the other lever system.

The other lever system likewise comprises a weighted lever having a weight 50 and an arm 51. It is fixed at its opposite end 52 to an arbor 53. Arbor 53 may be mounted in similar fashion as arbor 33. As shown, journals 54 and 55 at its opposite ends may be journaled in bearings 56 and 57 mounted in the face wall 12 and rear wall 15 respectively of the frame 11. A set screw 29 may be provided for adjustment of the bearing 57.

Fixedly mounted on the arbor 53 is an outwardly extending arm 58 corresponding to the arm 38 of the opposite lever system. It is pivotally connected by a pivot pin 61 to a spring holder 59 having a bifurcated end 60.

A helical retention spring 62 corresponding to helical spring 42 is secured at one end to the spring holder 59 and at its opposite end to an adjustably secured spring holder 63. This spring holder 63, corresponding to spring holder 43 may be provided with a threaded portion 64 extending into a female threaded opening 65 in the frame 11. Thus, the restraining force of spring 62 may be varied and adjusted. A set screw 66 may be provided for maintaining the spring holder 43 and consequently the spring 62 in predetermined adjustment in the same fashion as the spring 42.

Secured to arbor 53 is a segment gear 67 secured at its axis 68 to arbor 53. This gear segment 67 meshes with gear segment 47.

It will now be apparent that there are two lever systems provided which are operatively interconnected, each having its own adjustable yieldable restraining means. The arbors 33 and 53 provide rocker shafts and any swingable movement of one of the weighted levers within the range of their movement is correspondingly transmitted to the opposite lever system operating in the opposite direction through the intermeshing gear segments 47 and 67. The levers will swing in overlapping relationship between the axes of arbors 33 and 53 within the housing 10.

Figure 3:
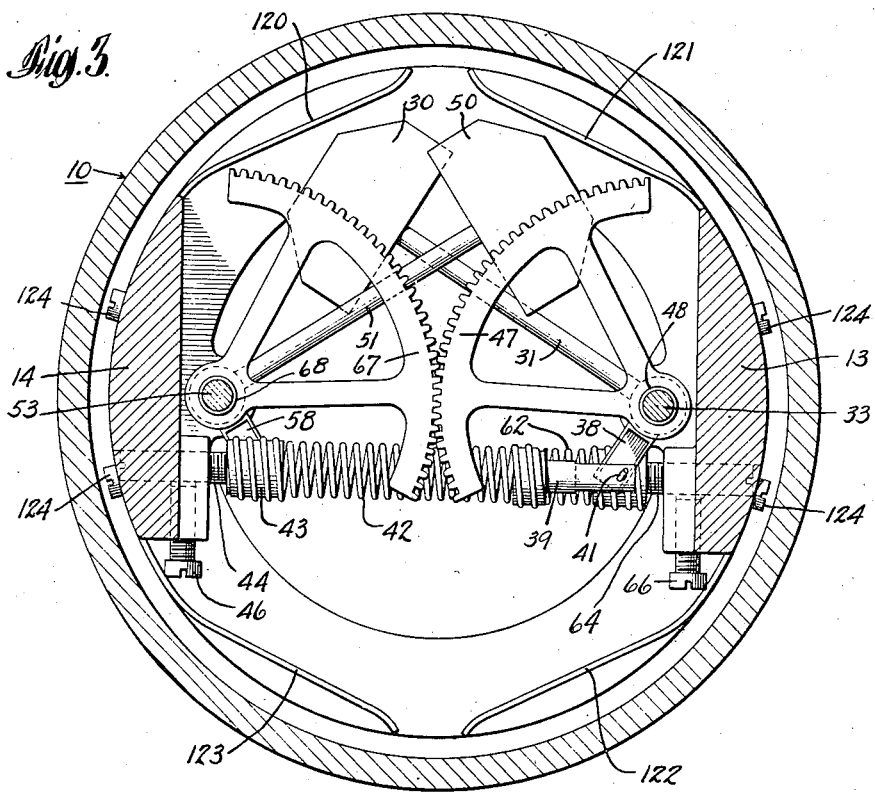
Fig. 3 is a plan section on line 3—3 of Fig. 1.
Figure 4:
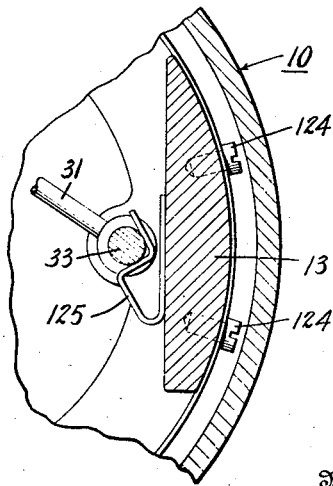
Fig. 4 is a fragmentary plan section on line 4—4 of Fig. 1.

Moreover, the weighted masses 30 and 50 may travel in an arcuate path in a relatively long arc and have freedom to move approximately equal amounts on either side of a plane through the axes of the arbors 33 and 53 which arbors form the pivots about which the lever arms 31 and 51 swing. Consequently, the undesirable effect of vibrations is minimized by reason of the long range of the mass movement and, furthermore, the weighted masses may swing in that part of their arc of travel where the force due to acceleration being measured exerts the greatest moment about the pivots of the arbors 33 and 53 (see Fig. 3).

It will be noted that the moment tending to swing the levers on their respective axes will vary when the angle between the above-mentioned plane and the lever arms varies. This variation might be compensated for by a corresponding calibration of the scale on the dial of the instrument. However, in accordance with the invention, this variation may be compensated for in the following manner.

The arms 38 and 58 extend substantially radially from the axes of their respective arbors 33 and 53 and at substantially right angles to the respective lever arms 31 and 51. The springs 42 and 62 are pivoted to the arms 38 and 58 respectively and are anchored at their respective opposite ends to spring holders 43 and 63.

It will be observed that, as the weighted levers swing about their axes in response to an accelerated movement of the device in the direction acceleration is being measured, the effective length of each of these lever arms 31 and 51 varies as the angle varies between each of these lever arms and a plane through the axes of arbors 33 and 53. Thus, the moment tending to swing each weighted lever about its axis will vary as the angle varies. Simultaneously, the resisting force of the restraining springs 42 and 62 is also varied in the same proportion, since the effective length of each of the lever arms 38 and 58 varies corresponding to the variation of the effective lengths of lever arms 31 and 51. Thus, a scale of uniform graduations may be used to measure acceleration accurately since the variation of the effective lengths of the weighted lever arms has been, so to speak, subjected to mechanical compensation.

Secured to the arbor 33 is a segment gear 69 which meshes with a pinion 70 carried by a transmission mechanism, described more in detail hereinafter.

Figure 7:
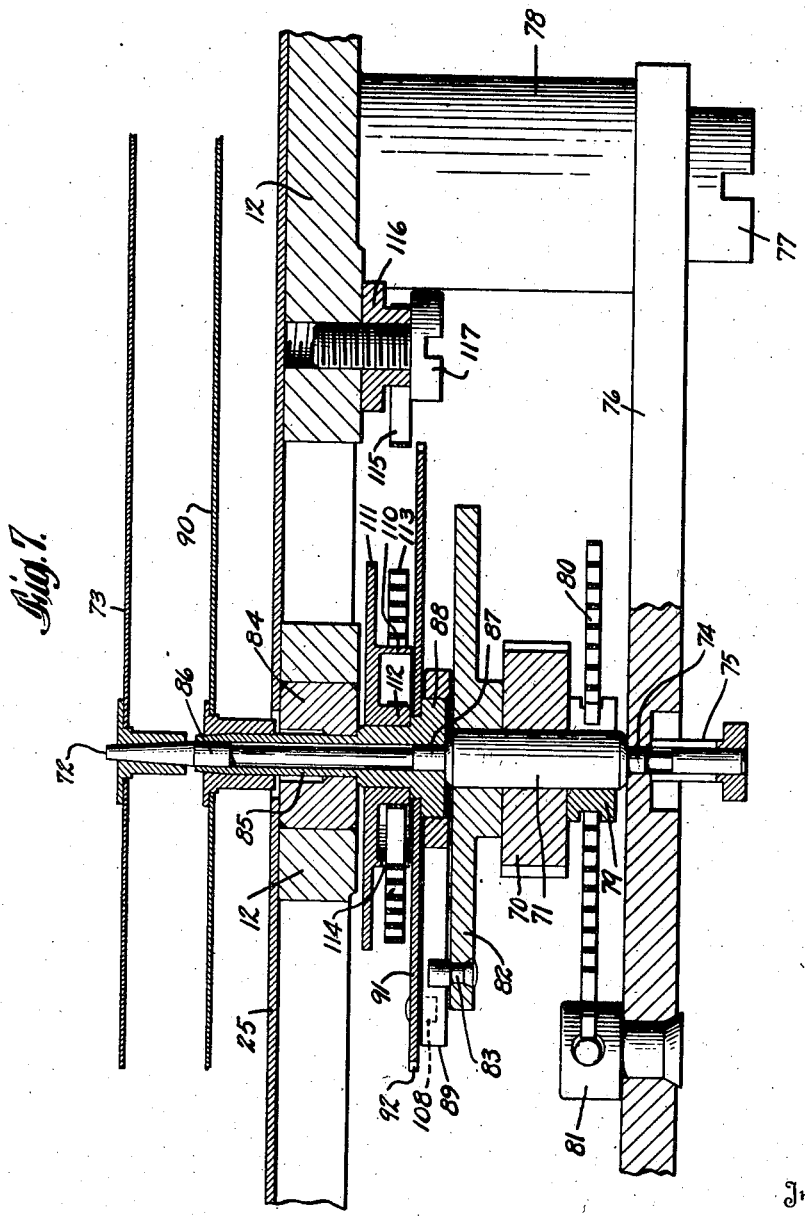
Fig. 7 is an enlarged fragmentary section on line 7—7 of Fig. 1.

Pinion 70 is secured to an enlarged portion 71 of a rotatable shaft 72, the outer end of which is provided with a pointer 73 adapted upon rotation of the shaft to traverse the scale 26 of the dial 25 (see Fig. 7). The inner end of the shaft 72 provides a journal 74 which may be provided with a slotted bushing or ring 75 preventing axial thrust between shaft 71 and a member 88 later to be described. A cross member 76 secured by screws 77 to lugs 78 extending inwardly from face wall 12 of the frame 11, provides a rigid spaced relation support for the journal 74 and the slotted ring 75.

A hub 79 is secured to the enlarged portion 71 of the shaft 72. It may have secured thereto a hair spring 80. The inner end of this hair spring may be secured to the hub 79 and the outer end may be secured to a stake 81 secured to the cross member 76. Thus, undesirable play or back lash of the shaft 72 and pointer 73 may be eliminated when these parts are actuated.

There is also secured to the enlarged portion 71 of the shaft 72, a disc 82 carrying near its periphery a pin 83, the purpose of which is pointed out hereinafter.

Journaled in bearing 84 in the face wall 12 of the frame 11 is a sleeve 85 concentric with shaft 72 and mounted to rotate about said shaft. The enlarged portions 86 and 87 of the shaft 72 provide bearing surfaces for the inner surface of the sleeve 85. The outer end of this sleeve may be provided with a pointer 90 adapted, upon rotation of the sleeve, to traverse the scale 26 of the dial 25. This pointer 90, as is pointed out in further detail hereinafter, provides a maximum reading pointer or hand, while the pointer 73 provides a momentary reading pointer or hand.

Rotatably mounted on a hub 88 secured to or integral with the sleeve 85 is a floating arm 89 adapted to be rotated about the sleeve when disc 82 is rotated and the pin or nose 83 engages the arm 89.

Figure 5:
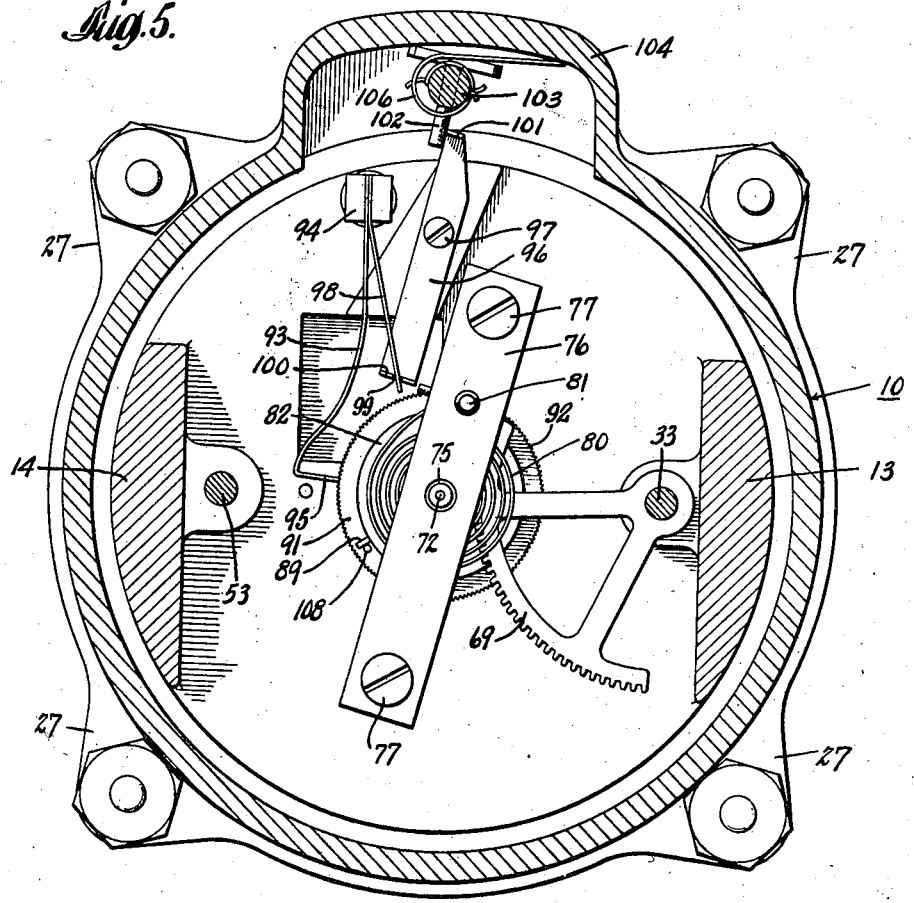
Fig. 5 is a section on line 5—5 of Fig. 1 looking toward the face of the instrument.
Figure 6:
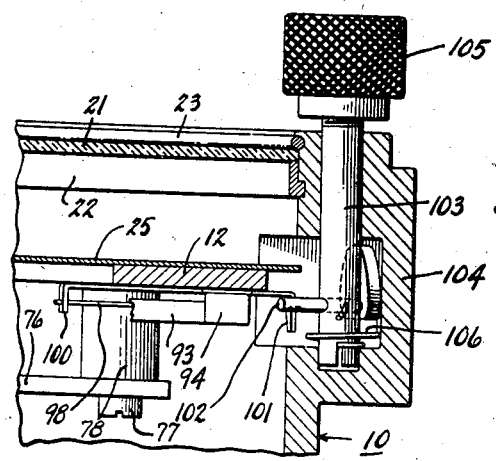
Fig. 6 is an enlarged fragmentary section on line 6—6 of Fig. 2.

Also secured to the sleeve 85 is a disc 91 provided with ratchet teeth 92 at its periphery. A click member or pawl 93 (see Fig. 5) which may be a leaf spring is secured at one end to a bracket 94 on the inner surface of the face wall 12 of the frame 11. The opposite end 95 of this leaf spring or pawl is bent substantially at right angles to the main portion thereof and is adapted to frictionally engage the ratchet teeth 92 of the disc 91 to hold same in any position to which it has been moved by the normal operation of the instrument. The end 95 functions as a resilient member acting in a plane substantially at a right angle to the plane of the main portion of the spring pawl 93 and is adapted to eliminate any "inching" or "stepping" of the toothed wheel 91 which might be induced by vibration or shock of the instrument as distinct from normal movement thereof. The resilient spring pawl 93 is mounted so that normally the end 95 is urged against the ratchet teeth 92. However, a lever 96 pivotally secured as by a screw 97 to the frame 11 is adapted to engage the spring 93 and disengage the end 95 from the ratchet teeth 92. A second spring 98 fixed at one end to bracket 94 and engaging the lever through a notch 99 normally urges the lever 96 away from the spring 93. This notch is struck out from a protruding shoulder 100 on the lever 96. The opposite end of this lever is also provided with a shoulder 101 extending outwardly therefrom. It is adapted to be engaged by a pin 102 extending from a shaft 103 journaled in the walls of a protruding portion 104 (see Fig. 6) of the housing or casing 10.

Shaft 103 is provided with a knurled hand knob 105 accessible at the outside of the housing. A spiral spring 106 normally urges the pin 102 away from the shoulder 101 of the lever 96. Upon rotation of the knob 105 to rotate the pin 102 in the direction of the shoulder 101, the lever, upon engagement of the pin 102 and shoulder 101, will cause the opposite shoulder 100 of the lever to engage the spring 93 and release the end 95 from the ratchet teeth. Upon release of the knurled knob 105 the pin 102 is disengaged from the shoulder 101 and the lever returned to normal position allowing the spring 93 again to engage the ratchet disc 91. Hence, the end 95 of spring 93 normally is in frictional engagement with the ratchet teeth 92.

Disc 91 is also provided with a pin 108 near its periphery which is adapted to be engaged by the floating arm 89 for a purpose described hereinafter.

Means providing a snubbing action for the sleeve 85 and maximum reading pointer 90 may comprise a hub 110 (see Fig. 7) of relatively large diameter which may be secured to or formed integral with a disc 111 which may have a smaller hub 112 whereby it may be securely fixed to the sleeve 85. A hair spring 113 having its inner end fixed to inner hub 112 may extend through an opening 114 (see Fig. 8a) and thence spirally around the hub 110. The other or loop end 115 of the hair spring may be fixed to a stake 116 secured to the face wall 12 of the frame 11 as by a screw 117. It will be apparent that the discs 111 and 91 will also serve as protecting walls to prevent snarling of the hair spring 113. The hair spring in addition to its arrangement for snubbing action also tends to prevent play and back-lash of the sleeve and pointer 90 when they are actuated.

The frame 11 is also provided with a plurality of leaf springs, 120, 121, 122, and 123. One end of each may be secured to the frame as by screws 124. The opposite ends of these springs may engage the inner surface of the cylindrical side wall 19 of the housing. These springs provide buffers or "soft stops" for the weights 30 and 50 when they are swung to maximum extent about their axes of rotation.

Another spring 125 may be mounted on the frame 11 to frictionally engage the arbor 33. This spring is useful in further eliminating undesirable play of the lever systems.

The operation of the instrument when measuring the acceleration of a moving body is as follows: It may be assumed that the instrument is given a movement in the direction of which acceleration is to be measured. The centers of gravity of the weighted levers 31 and 51 are away from their axes of rotation. By reason of the inertia of the masses, the levers are caused to swing in overlapping relation about their axes of rotation. This causes a rotation in opposite directions of the arbors 33 and 53. The rotation is transmitted in balanced relation through the intermeshing gear segments 47 and 67.

By providing two corresponding lever systems, in accordance with the invention, forces in directions along axes other than that in which acceleration is to be measured are balanced out. If the instrument is tilted from a horizontal plane, the action of gravity upon the weighted levers will be counteracted since the action is transmitted from one lever system to the other in opposite directions. Furthermore, by providing each lever system with its own adjustable resilient restraining springs 42 and 62, driving friction between gear segments 47 and 67 is minimized or substantially eliminated and, as pointed out, they compensate for the arcuate movement of the weighted masses 30 and 50, all of which tends to greater accuracy of the instrument.

The extent of rotation or swinging of the weights 30 and 50 about their axes is a function of the magnitude of rate of change of velocity in a given movement of the instrument. Accordingly, this rotation is transmitted by the arbor or rocker shaft 33 through the driving gear segment 69 to cause a corresponding rotation of the pinion 70.

The pinion 70 being secured to the main shaft 72 will cause a corresponding rotation of the pointer 73. Since the lever systems, gear segment 69, pinion 70 and shaft 72 are in constant operatively connected engagement, the pointer 73 will constantly indicate momentary changes of acceleration or deceleration in the direction of which rate of change of velocity is being measured. The quantitive measurement may be indicated on the uniformly graduated scale of the dial which is traversed by the pointer. In the instrument shown, the reading may be in *g* units. It will be observed that in the particular graduation of the scale of the instrument shown, one revolution of the pointer 73 indicates nine *g*'s. It will be apparent that other graduations may be used and the instrument may be correspondingly calibrated prior to use.

Hence, it will be seen that in a given movement of the instrument, rate of change of velocity may be read at any instant by observing the pointer 73. Since rate of change of velocity will effect a corresponding movement of the weights 30 and 50, there will be a corresponding relative movement of the pointer 73 over the scale 26.

Should it be desired to measure the maximum acceleration for any given movement of the instrument this may be accomplished with facility. When the instrument is normally at rest, the pointers 73 and 90, the disc 82, the ratchet disc 91, the floating arm 89 and the hair spring 113 will be in the positions shown diagrammatically in Figs. 8 and 8a. If the instrument is given an accelerated movement the maximum of which is to be measured, the weighted levers are caused to swing as described in the foregoing. This will cause arbor 33 to rock the segment 69 to rotate the pinion 70 which in turn causes a corresponding rotation of the shaft 72 and the driving disc 82 in a clockwise direction. Pin 83 on disc 82 will engage the floating arm 89 causing it to rotate or swing about its axis of rotation. The floating arm in turn will engage pin 108 of the ratchet disc 91 and cause this disc to be rotated in the same direction. Since the disc 91 is secured to the sleeve 85, it will cause the pointer 90 to be rotated in the same direction.

Referring now more specifically to Fig. 9, showing diagrammatically that the instrument has been given an acceleration of ten *g*'s. (One revolution of the pointer 73 indicates nine *g*'s on this particular scale.) The momentary reading pointer 73 will have made a rotation as indicated by the arrow line *a* and the maximum reading pointer will have been given a corresponding rotation indicated by the arrow line *b*.

If the instrument is then brought to constant velocity the momentary reading pointer 73 will return to zero on the scale 26 as indicated by arrow line *c* (Fig. 10) because this pointer, as pointed out hereinbefore, is in constant operative connection with the lever systems. The lever systems will be returned to normal zero position when the instrument comes to constant velocity or to rest by reason of the action of the two retention springs 42 and 62.

It will be observed that the pointer 73 and the disc 82 returning to zero position as indicated in Fig. 10 will not operate disc 91 since the floating arm is not engaged by pin 83 until disc 82 has travelled almost a complete revolution in a counterclockwise direction. In the meantime, pin 108 has not been moved although pin 83 has engaged arm 89 on the opposite side. Hence, pointer 90 is retained at its position of maximum acceleration and will remain there. This has been brought about by reason of the hair spring 113 and the frictional engagement of the spring pawl 93 which temporarily holds the disc 91 from further rotation in either direction.

To reset the maximum reading pointer to zero; for example, when another maximum reading for a given movement of the instrument is to be made, the knurled knob 105 may be rotated to actuate lever 96 in turn to disengage the pawl 93 from the ratchet disc 91. Thereupon the hair spring 113 which has in the meantime been at least partially wound up on the hub 114 will cause the disc 91 to rotate and return it to normal zero position. The instrument and its parts will then again be in the position shown diagrammatically in Fig. 8.

In using and shipping instruments of the character comprehended by the invention, it often happens that they are subjected to abnormal forces or shocks and to accelerations far exceeding the calibrated range of the instrument. It has sometimes been the practice to provide locking devices for the moving parts to protect the instrument when being shipped or when not in use. In accordance with the present invention, a snubbing arrangement is provided whereby an independent locking device is not necessary. Furthermore, this arrangement protects the delicate parts from damage, injury or breakage even though the instrument is given abnormal shocks and excessive acceleration either when being shipped or handled or when in use.

To illustrate this feature of the invention, it may be assumed that the instrument is subjected to an abnormal force such as being dropped. Such a fall may impart an abnormal acceleration tending to rotate both the momentary reading indicator 73 and the maximum reading indicator 90 beyond the normal workable range of the instrument. According to the invention, however, when such acceleration is imparted to the instrument, the hair spring 113 will wind itself upon the hub 110. The hub 110 is so proportioned that a relatively big "wind-up" of the spring results from a relatively small rotation of the hub. It is so adjusted that the action of the maximum reading pointer will be gently but effectively snubbed, on say, one and one-half revolutions of the maximum reading pointer. Hence, the momentum of the rotating pointer will not carry the delicate parts beyond a predetermined limit and no shocks will be imparted to them to damage or break them as otherwise would be the result of subjecting the instrument to such abnormal forces.

Fig. 11 and Fig. 11a show diagrammatically the hair spring windup and snubbing effect when the instrument is subjected to an abnormally great acceleration. It will be observed that momentary reading pointer 73 has reached its range of movement and will be restrained by the relatively strong retention springs 42 and 62 since the lever systems are in constant operatively connected engagement with the shaft 72

(see Fig. 1). On the other hand, pointer 90 and the hollow shaft 85 to which it is secured will tend to rotate further due to the momentum imparted to it by the shock of the excessive acceleration. The hair spring 113 and the ratchet disc 91 and pawl 93 provide some restraining force but not sufficient to prevent a tendency to "spin" the pointer 90. However, by reason of the maximum windup of the hair spring 113 on the hub 110 the rotation of pointer 90 is effectively snubbed at a predetermined point as indicated in Figs. 11 and 11a. Thus, if the instrument is given an abnormally great acceleration, the delicate parts of the instruments will be protected from damage and breakage.

Referring now to Fig. 12 there is shown diagrammatically the position of the floating arm 89 with the instrument brought to constant speed or to rest and the momentary pointer returned to zero. The maximum reading pointer 90 remains at maximum acceleration indication until the instrument is reset as described hereinbefore. A simple turn of the knob 105 will cause the spring 113 to unwind and return the pointer 90 to zero position.

Referring now to Fig. 13 there is shown diagrammatically what might be expected to happen but for the snubbing action of the hair spring 113. If the instrument were given an abnormal acceleration, the maximum reading pointer would be given a rotational movement tending to spin it by reason of the momentum imparted to it. The pin 108 of disc 91 would overtake the floating arm 89 which in turn would engage pin 83 of disc 82 with a "butting" action. This undesirable action would result in breakage of or damage to the delicate parts of the instrument. In accordance with the invention, however, this undesirable result is eliminated.

Furthermore, the "soft stops" provided by the leaf springs 120, 121, 122 and 123, prevent the weights 30 and 50 of the lever systems from striking the casing wall 19 with abrupt shock when the levers are caused to swing to their limits of movement. Thus, additional protection is afforded to the moving parts of the instrument.

It will be seen from the foregoing description that the invention provides an instrument which will maintain its accuracy even after being subjected to abnormal forces. No independent locking devices are necessary to render the instrument inoperative for protection to the operative parts in shipping and handling.

Obviously the present invention is not restricted to the particular embodiments herein shown and described, but may be modified without departing from the spirit of the present invention.

What is claimed is:

1. In an indicating instrument of the character described comprising, in combination, a first and instant value pointer; a second and maximum value pointer; a first shaft carrying said first pointer; a second shaft coaxial with said first shaft and carrying said second pointer; an actuating mechanism connected to said first shaft to actuate said shaft; a toothed disk on said second shaft, said disk carrying a first projection; a floating arm movable co-axially with said disk and adapted to be engaged on one side by said first projection; a member carried by said first shaft said member having a second projection adapted to engage the other side of said floating arm; and a pawl member mounted to engage said toothed disk.

2. In an indicating instrument of the character described comprising, in combination, a first and instant value pointer; a second and maximum value pointer; a first shaft carrying said first pointer; a second shaft coaxial with said first shaft and carrying said second pointer; an actuating mechanism connected to said first shaft to actuate said shaft, a toothed disk on said second shaft said disk carrying a first projection; a floating arm movable co-axially with said disk and adapted to be engaged on one side by said first projection; a member carried by said first shaft, said member having a second projection adapted to engage the other side of said floating arm; a flat spring having a first portion extending substantially radially with respect to said disk and engaging the teeth of said disk and a second portion extending at an angle to said first portion to provide resiliency for said first portion in a radial direction, with respect to said disk, said second portion being fixedly mounted; a hair spring connected to said second shaft to bias said shaft towards a zero position; and means for disengaging said flat spring and said disk, whereby the second pointer will be returned to zero.

3. In an indicating instrument of the character described comprising, in combination, a first and instant value pointer; a second and maximum value pointer; a first shaft carrying said first pointer; a second shaft coaxial with said first shaft and carrying said second pointer; an actuating mechanism connected to said first shaft to actuate said shaft; a toothed disk on said second shaft said disk carrying a first projection; a floating arm movable co-axially with said disk and adapted to be engaged on one side by said first projection; a member carried by said first shaft, said member having a second projection adapted to engage the other side of said floating arm; a pawl member mounted to engage said toothed disk; a hub member on said second shaft; and a hair spring having one end secured to a fixed point and having its other end connected to said second shaft, the hair spring being arranged to wind up on said hub member and snub the second member at the end of two full revolutions, said hair spring being tensioned to bias said second shaft towards a zero position.

4. In an indicating instrument, the combination of a first and instant value pointer; a second and maximum value pointer; a first shaft carrying said first pointer; a second shaft coaxial with said first shaft and carrying said second pointer; an actuating mechanism connected to said first shaft to actuate said shaft; a first member on said first shaft carrying a first projection; a floating arm movable coaxially with said first member and adapted to be engaged on one side by said first projection; a second member on said second shaft carrying a second projection adapted to engage the other side of said floating arm; and means for holding said second shaft in a given rotary position.

5. In an indicating instrument, the combination of a first and instant value pointer; a second and maximum value pointer; a first shaft carrying said first pointer; a second shaft coaxial with said first shaft and carrying said second pointer; an actuating mechanism connected to said first shaft to actuate said shaft; a first member on said first shaft carrying a first projection; a floating arm movable coaxially with said first member and adapted to be engaged on one side by said first projection; a second member on said second shaft carrying a second projection adapted to engage the other side of said floating arm; a hair spring connected to said second shaft urging said second pointer towards a zero position; and releasable means for holding said second shaft in a given rotary position against the action of the hair spring.

6. An indicating instrument comprising, in combination, a maximum pointer; a shaft carrying said pointer; a toothed disk mounted on said shaft; actuating means for rotating said shaft; a single piece flat spring arranged in substantially the same plane as said disk, said spring having a first and free portion extending substantially radially with respect to said disk and having its free end normally engaging the teeth of said disk and having resiliency in a direction tangential with respect to said disk and a second portion secured to a fixed point, said second portion extending at an angle with respect to said first portion to provide resiliency for said first portion in a direction radial with respect to said disk, the angle between said first and second portions providing for sufficient resiliency of said spring to permit slight rotary movement of said disk under vibrations of the instrument without a resulting change in the indication; and means operative to disengage temporarily said first portion from engagement with said disk.

PAUL KOLLSMAN.